United States Patent
Agombar et al.

(10) Patent No.: US 10,133,630 B2
(45) Date of Patent: Nov. 20, 2018

(54) DISPOSABLE SUBSET PARITIES FOR USE IN A DISTRIBUTED RAID

(71) Applicant: International Business Machines Corporation, Armonk, NY (US)

(72) Inventors: John P. Agombar, Winchester (GB); Ian Boden, Eastleigh (GB); Alastair Cooper, Winchester (GB); Gordon D. Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/257,325

(22) Filed: Sep. 6, 2016

(65) Prior Publication Data

US 2018/0067828 A1  Mar. 8, 2018

(51) Int. Cl.
| | |
|---|---|
| *G06F 11/00* | (2006.01) |
| *G06F 11/10* | (2006.01) |
| *G06F 11/16* | (2006.01) |
| *G06F 3/06* | (2006.01) |

(52) U.S. Cl.
CPC .......... *G06F 11/1076* (2013.01); *G06F 3/064* (2013.01); *G06F 3/0619* (2013.01); *G06F 3/0689* (2013.01); *G06F 11/1662* (2013.01); *G06F 2201/805* (2013.01)

(58) Field of Classification Search
CPC .................................... G06F 11/1076–11/1096
See application file for complete search history.

(56) References Cited

U.S. PATENT DOCUMENTS

| | | | |
|---|---|---|---|
| 5,258,984 A | 11/1993 | Menon et al. | |
| 5,596,709 A * | 1/1997 | Bond | G06F 11/1084 714/6.32 |
| 6,151,659 A | 11/2000 | Solomon et al. | |
| 7,346,831 B1 * | 3/2008 | Corbett | G06F 11/1076 714/5.11 |

(Continued)

OTHER PUBLICATIONS

Hou, et al., Abstract of "Balancing I/O Response Time and Disk Rebuild Time in a Raids Disk Array," System Sciences, Proceeding of the Twenty-Sixth Hawaii International Conference, vol. 1, pp. 70-79, 1993.

(Continued)

*Primary Examiner* — Michael Maskulinski
(74) *Attorney, Agent, or Firm* — Nelson and Nelson; Daniel P. Nelson; Alexis V. Nelson (57) ABSTRACT

A method for recovering a failed storage drive in a redundant array of independent disks (RAID) includes storing, on a first distributed spare of the RAID, a first parity subset for a first set of drives in the RAID. The method further stores, on a second distributed spare of the RAID, a second parity subset for a second set of drives in the RAID. In the event a storage drive in the RAID fails, the method determines whether the storage drive belongs to the first set or second set. In the event the failed storage drive belongs to the first set, the method uses the first parity subset on the first set of drives in the RAID to recover the failed storage drive. In the event the failed storage drive belongs to the second set, the method uses the second parity subset on the second set of drives in the RAID to recover the failed storage drive. A corresponding system and computer program product are also disclosed.

20 Claims, 8 Drawing Sheets

(56) References Cited

U.S. PATENT DOCUMENTS

| | | | |
|---|---|---|---|
| 7,669,107 B2 | 2/2010 | Forhan et al. | |
| 8,156,368 B2 | 4/2012 | Chambliss et al. | |
| 8,839,028 B1* | 9/2014 | Polia | G06F 11/1084 |
| | | | 714/6.24 |
| 9,164,827 B2 | 10/2015 | Syrgabekov et al. | |
| 9,430,367 B1* | 8/2016 | Subramanian | G06F 12/02 |
| 2012/0331225 A1* | 12/2012 | Jones | G06F 3/0605 |
| | | | 711/114 |
| 2015/0006956 A1* | 1/2015 | Syrgabekov | G06F 11/1088 |
| | | | 714/15 |
| 2017/0161146 A1* | 6/2017 | Han | G06F 11/1088 |

OTHER PUBLICATIONS

Buyya, et al., Abstract of "Comparison of Sparing Alternatives for Disk Arrays," Wiley-IEEE Press, Edition 1, pp. 117-128, 2002.

* cited by examiner

DISPOSABLE SUBSET PARITIES FOR USE IN A DISTRIBUTED RAID

BACKGROUND

Field of the Invention

This invention relates to systems and methods for rebuilding data in a distributed RAID in response to a storage drive failure.

Background of the Invention

A RAID (i.e., a Redundant Array of Independent Disks) is a storage technology that provides increased storage functions and reliability through redundancy. A RAID is created by combining multiple storage drive components (disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

To improve the I/O performance of a RAID and/or accelerate the rebuild process when a storage drive fails, techniques such as "wide striping" and "distributed spares" are used. With wide striping, data is distributed more widely across a larger set of storage drives. This improves average I/O performance since data may be read from or written to a larger set of storage drives in parallel, thereby aggregating the I/O performance of each of the storage drives. Wide striping may also reduce the time required to rebuild a RAID in the event of a failure, since the data needed to rebuild the failed drive may be read in parallel from a larger set of storage drives.

With distributed spares, a small amount of storage space is reserved on each storage drive belonging to a distributed RAID. Collectively, this storage space may be substantially equivalent to the entire storage space of one physical spare storage drive. When a storage drive in the RAID fails, data may be rebuilt on the distributed spare instead of a physical spare storage drive. The distributed spare allows data to be rebuilt much more quickly since data may be written to many storage drives in parallel as opposed to a single physical storage drive. Once data from the failed storage drive is reconstructed on the distributed spare, the data may be copied to a single physical spare storage drive to free up the storage space on the distributed spare, thereby making it available for future drive failures.

Despite the theoretical advantages of wide striping and distributed spares, hardware limitations may limit the actual performance gains provided by each of these technologies. For example, most RAID arrays use the serial attached SCSI (SAS) protocol to move data into and out of the storage drives. The amount of data that can be moved in and out of a RAID as part of a rebuild process is limited by the SAS chip and/or a bus (e.g. PCI bus) that is used to move data between the SAS chip and a CPU. This bottleneck currently limits the number of storage drives that may be included in a distributed RAID to about one hundred and twenty. Currently, if the number of storage drives in increased beyond about one hundred and twenty, performance and/or reliability of the distributed RAID may actually decrease.

In view of the foregoing, what are needed are systems and methods to increase the number of storage drives that may be included in a distributed RAID. Ideally, such systems and methods will reduce the amount of data that needs to be processed by hardware such as SAS chips and PCI buses during a RAID rebuild process.

SUMMARY

The invention has been developed in response to the present state of the art and, in particular, in response to the problems and needs in the art that have not yet been fully solved by currently available systems and methods. Accordingly, the invention has been developed to more effectively rebuild data in a distributed RAID in response to a storage drive failure. The features and advantages of the invention will become more fully apparent from the following description and appended claims, or may be learned by practice of the invention as set forth hereinafter.

Consistent with the foregoing, a method for recovering a failed storage drive in a redundant array of independent disks (RAID) is disclosed herein. In one embodiment, such a method stores, on a first distributed spare of the RAID, a first parity subset for a first set of drives in the RAID. The method further stores, on a second distributed spare of the RAID, a second parity subset for a second set of drives in the RAID. In the event a storage drive in the RAID fails, the method determines whether the storage drive belongs to the first set or second set. In the event the failed storage drive belongs to the first set, the method uses the first parity subset on the first set of drives in the RAID to recover the failed storage drive. In the event the failed storage drive belongs to the second set, the method uses the second parity subset on the second set of drives in the RAID to recover the failed storage drive.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
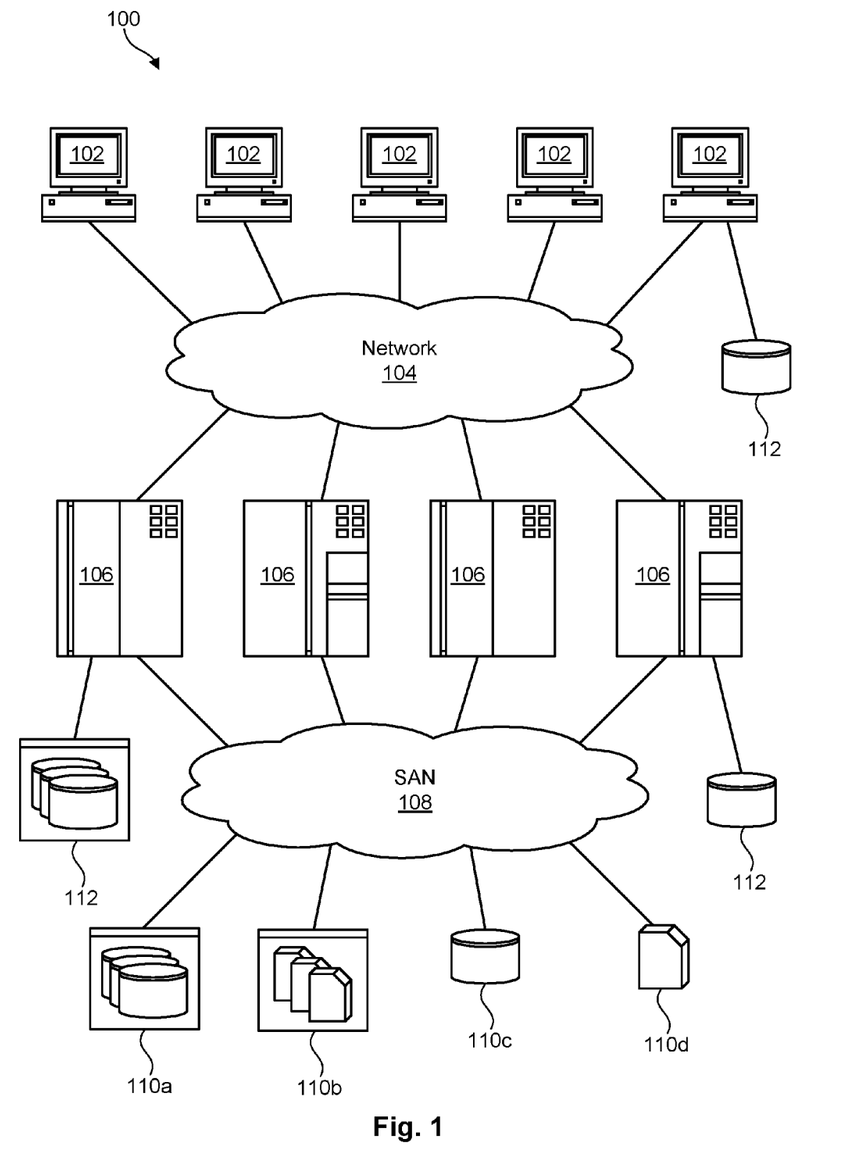
FIG. 1 is a high-level block diagram showing one example of a network environment in which a system and method in accordance with the invention may be configured to operate.

Referring to FIG. 1, one example of a network environment 100 is illustrated. The network environment 100 is presented to show one example of an environment where embodiments of the invention may operate. The network environment 100 is presented only by way of example and not limitation. Indeed, the apparatus and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
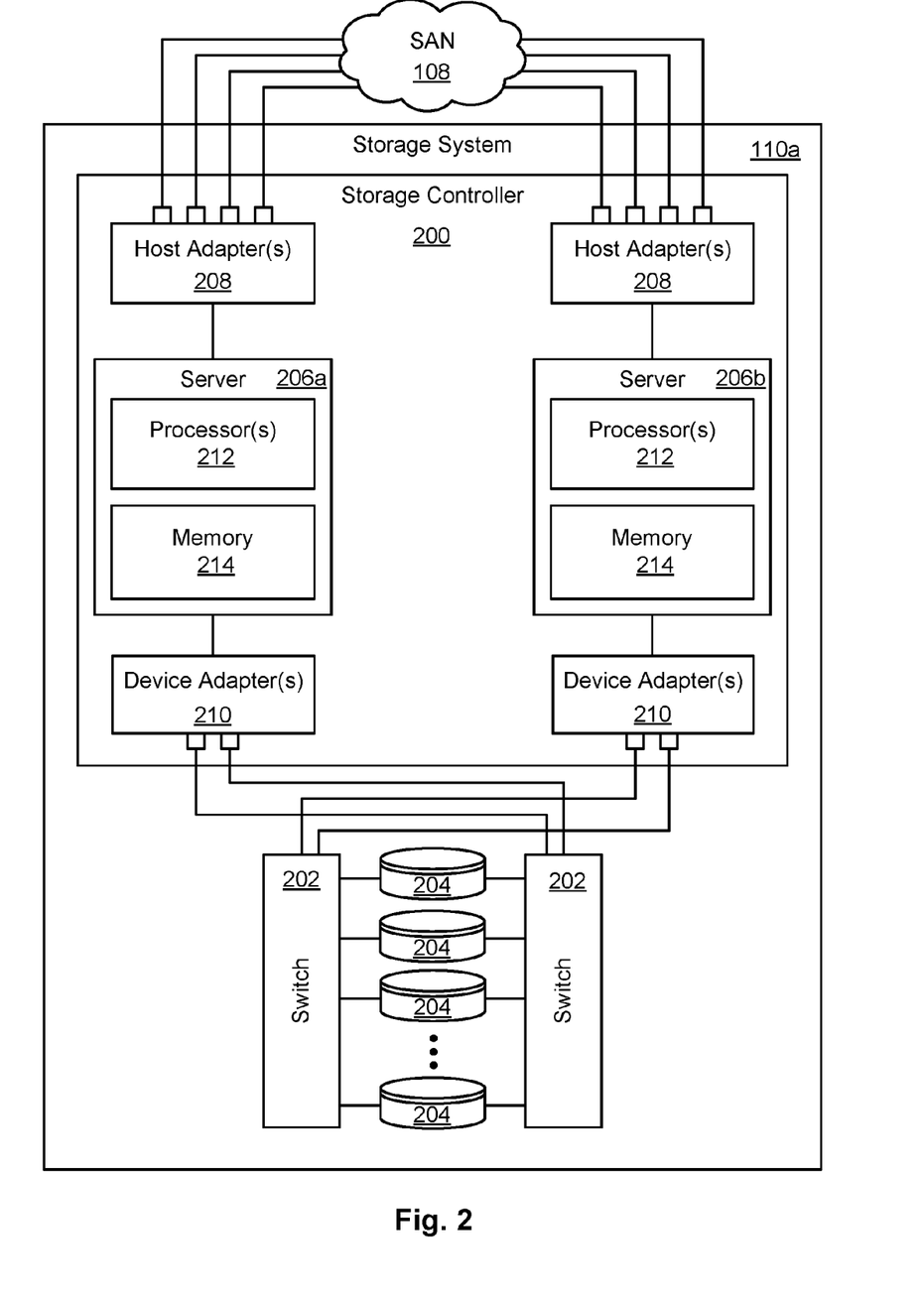
FIG. 2 is a high-level block diagram showing one embodiment of storage system that may implement a RAID.

Referring to FIG. 2, one example of a storage system 110a containing an array of hard-disk drives 204 and/or solid-state drives 204 is illustrated. The internal components of the storage system 110a are shown since a distributed RAID may, in certain embodiments, be implemented all or partly within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
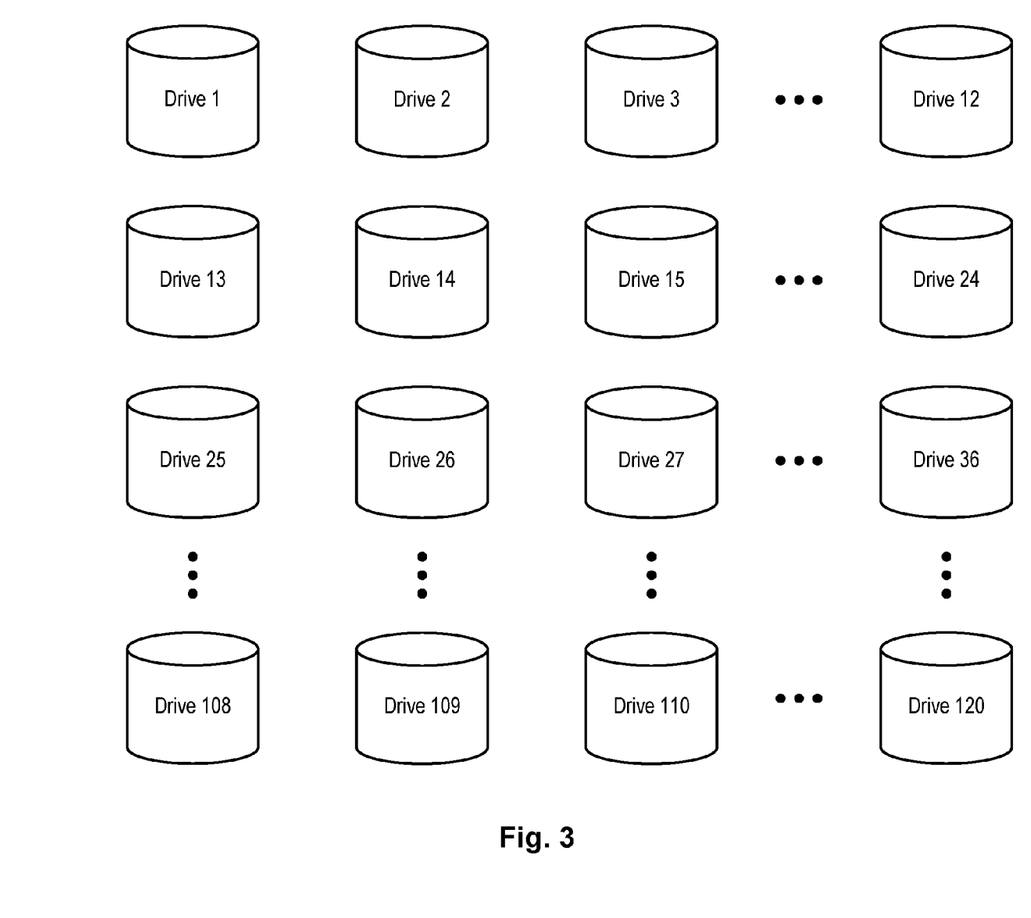
FIG. 3 is a high-level diagram showing a large set of storage drives, in this example one hundred and twenty storage drives, that utilizes "wide striping" to implement a distributed RAID.

Referring to FIG. 3, a high-level diagram showing a large set of storage drives (labeled as Drive 1 through Drive 120), in this example one hundred and twenty storage drives, is illustrated. The set of storage drives may, in certain embodiments, utilize "wide striping" to implement a distributed RAID. As previously explained, when using wide striping, data is distributed more widely across a larger set of storage drives. This improves average I/O performance since data may be read from or written to a larger set of storage drives in parallel, thereby aggregating the I/O performance of each of the storage drives. Wide striping may also reduce the time required to rebuild a RAID in the event of a failure, since the data needed to rebuild the failed drive may be read in parallel from a larger set of storage drives.

Figure 4:
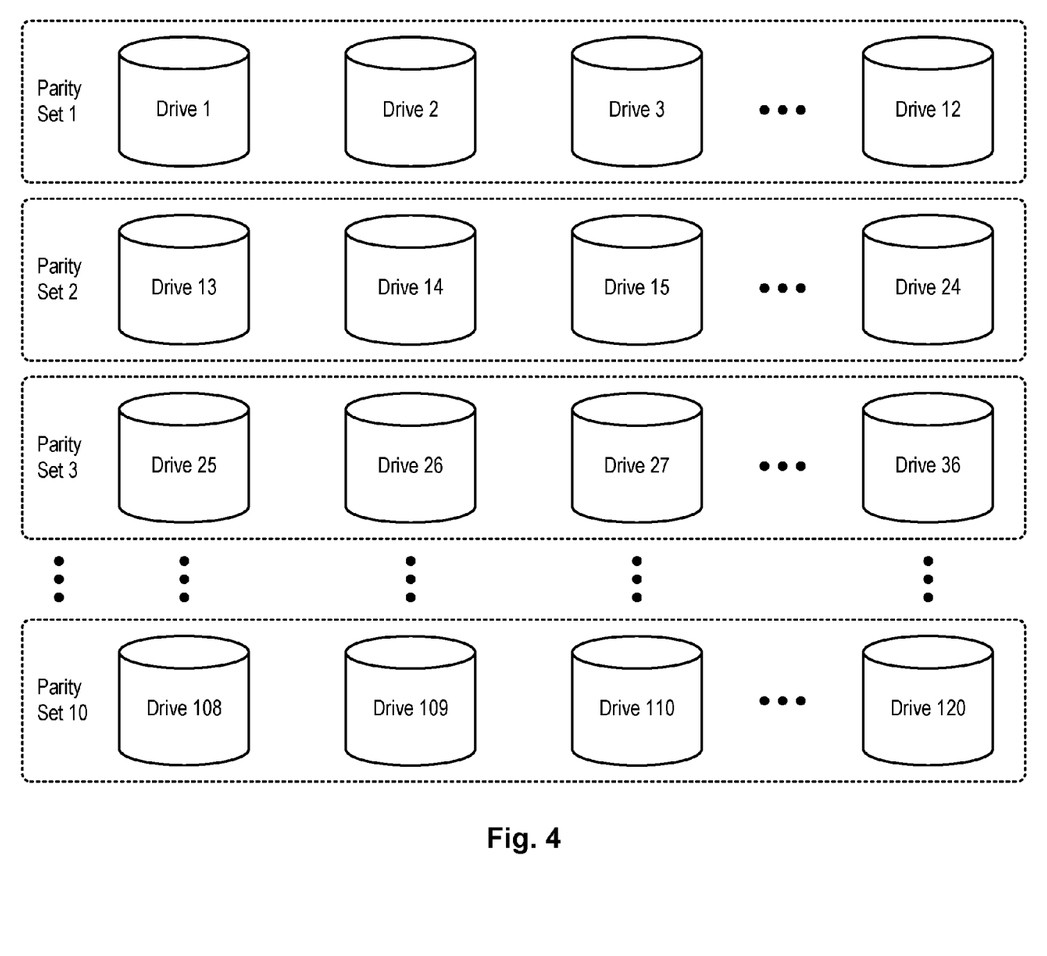
FIG. 4 shows various conventional parity sets that may be included in the distributed RAID of FIG. 3.

Referring to FIG. 4, because data is distributed across a larger set of storage drives, data needs to be read from more storage drives when rebuilding data associated with a failed storage drive. In certain embodiments, when using wide striping, the data on a distributed RAID may be organized in such a way that rebuilding any data element (e.g., block, chunk, strip, etc) on a failed storage drive requires reading a smaller set of storage drives in the distributed RAID. For example, in an array of one hundred and twenty storage drives, the first ten percent of a failed storage drive may be reconstructed using data on Drives 1 through 12 (i.e., parity set 1), the second ten percent of the failed storage drive may be reconstructed using data on Drives 13 through 24 (i.e., parity set 2), the third ten percent of the failed storage drive may be reconstructed using data on Drives 25 through 36 (i.e., parity set 3), and so forth. Each subset of storage drives in the distributed RAID may make up a "parity set," as illustrated in FIG. 4.

In such a configuration, only eleven storage drives (i.e., the twelve storage drives in the parity subset minus the one failed storage drive) are needed to reconstruct any particular data element on a failed storage drive, although all one hundred and nineteen storage drives (i.e., the one hundred and twenty storage drives in the distributed RAID minus the one failed storage drive) are needed to reconstruct all the data on the failed storage drive. Stated otherwise, data may need to be read from all one hundred and nineteen remaining storage drives in the distributed RAID in order to reconstruct data associated with a single failed storage drive.

Although the above-described process could theoretically enable a failed storage drive to be rebuilt faster (by allowing data to be read in parallel from one hundred and nineteen storage drives), hardware limitations may limit the actual performance gains provided by wide striping. For example, many RAID arrays use the serial attached SCSI (SAS) protocol to move data into and out of the storage drives. The amount of data that can be moved in and out of a RAID as part of a rebuild process is limited by the SAS chip and/or a bus (e.g. PCI bus) that is used to move data between the SAS chip and a CPU. This bottleneck currently limits the number of storage drives that may be included in a distributed RAID to about one hundred and twenty. Currently, if the number of storage drives is increased beyond about one hundred and twenty, performance and/or reliability of the distributed RAID may decrease.

Figure 5:
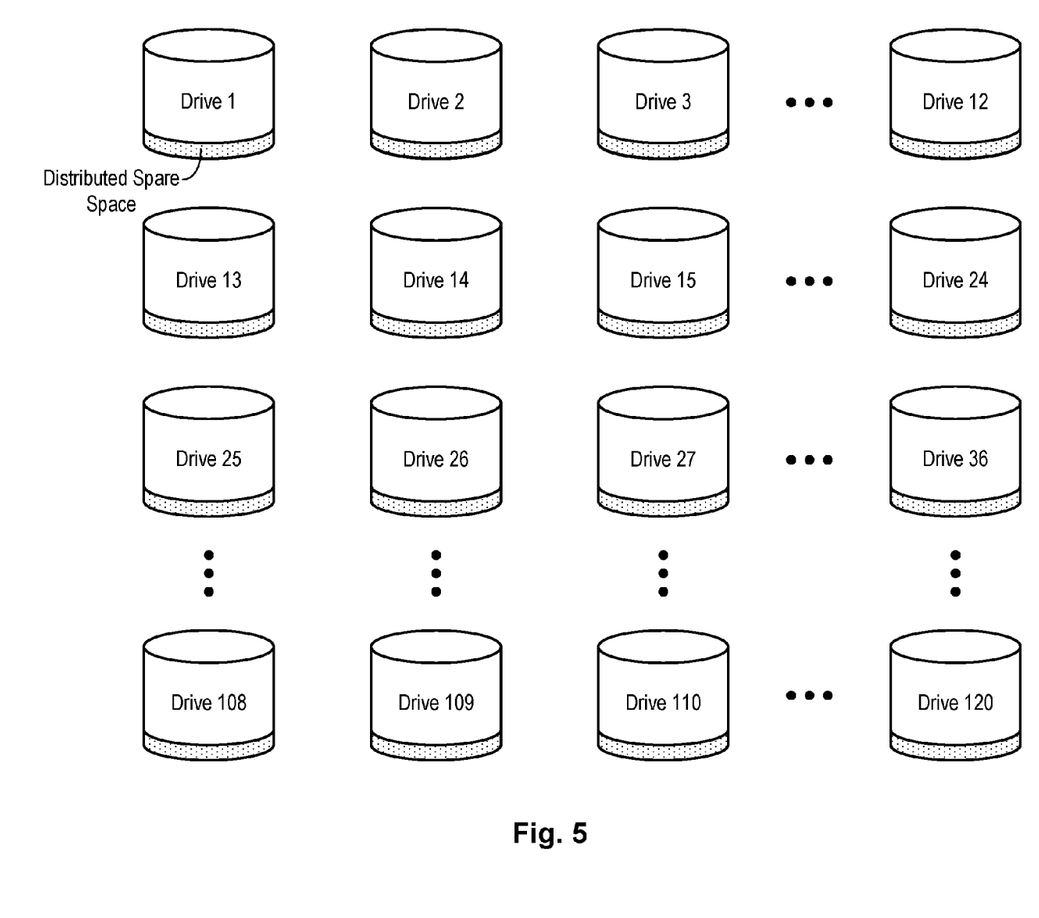
FIG. 5 shows how a distributed spare may be incorporated into the distributed RAID of FIG. 3.

Referring to FIG. 5, as previously mentioned, a distributed RAID may be configured to include one or more "distributed spares." To create a distributed spare, a small amount of storage space may be reserved on each storage drive belonging to a RAID, as shown by the shaded portion of each storage drive in FIG. 5. Collectively, the storage space may be substantially equivalent to the entire storage space of a single spare physical storage drive. In other words, the shaded portion of each storage drive when added together may substantially equal the entire storage space of one physical storage drive. When a storage drive in the RAID fails, data may be initially rebuilt on the distributed spare instead of a physical spare storage drive. The distributed spare allows data to be rebuilt much more quickly since data may be written to many storage drives in parallel, as opposed to a single physical storage drive. Rebuild speed may also be increased because the distributed spare resides on storage drives that are already active and spinning, thereby making them immediately available to receive data. Once data from the failed storage drive is reconstructed on the distributed spare, the data may be copied to a physical spare storage drive to free up the storage space on the distributed spare, thereby making it available for future drive failures.

Figure 6:
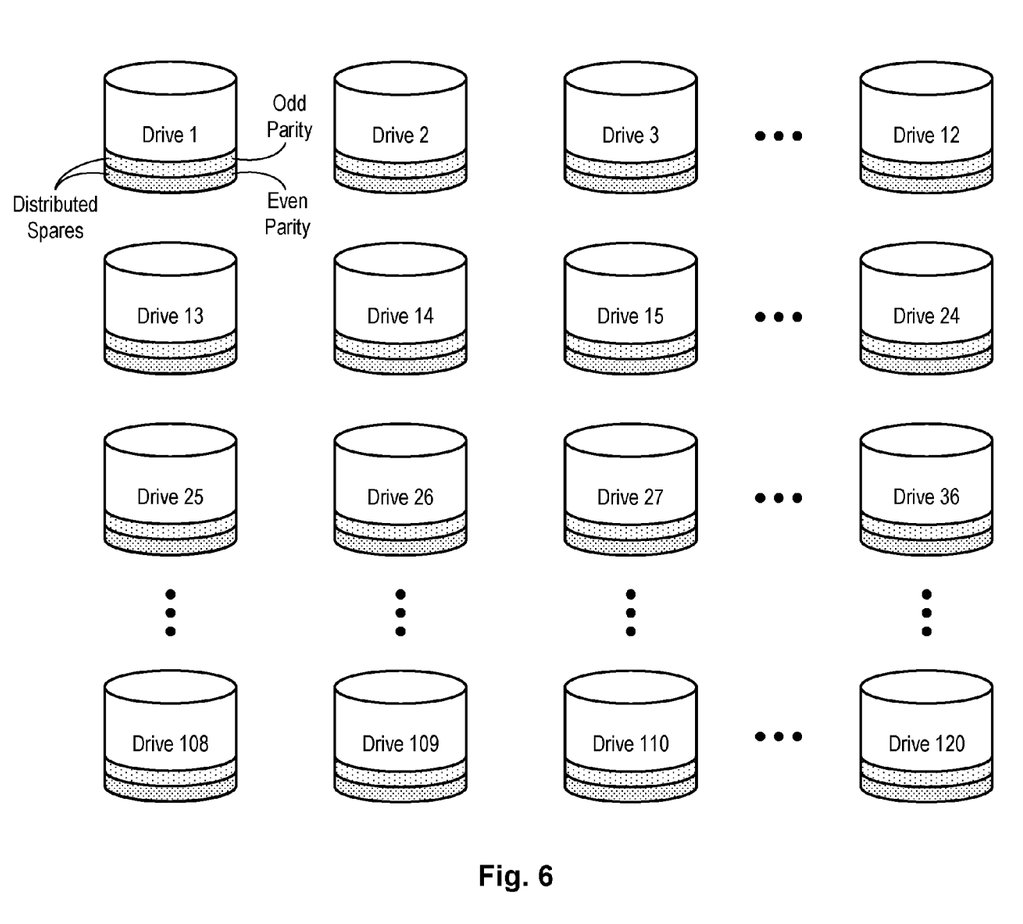
FIG. 6 shows multiple distributed spares incorporated into the distributed RAID of FIG. 3, wherein a first distributed spare stores an odd parity subset for odd storage drives in the distributed RAID, and a second distributed spare stores an even parity subset for even storage drives in the distributed RAID.

Referring to FIG. 6, in certain configurations, a distributed RAID may include multiple distributed spares, as shown by the two distinct shaded portions on each storage drive. These distributed spares may be used to receive reconstructed data for up to two storage drive failures. Prior to a storage drive failing, the distributed spares may be empty or void of important data. Because the distributed spare sits empty and unused prior to a storage drive failure, embodiments of the invention may advantageously use this storage space during this time period.

In certain embodiments in accordance with the invention, selected parity information may be stored in the distributed spares while they are not in use. For example, in a distributed RAID comprising two distributed spares, a first distributed spare may be used to store an odd parity subset and a second distributed spare may be used to store an even parity subset. The odd parity subset may be used to reconstruct data associated with an odd storage drive in the event the odd storage drive fails. By contrast, the even parity subset may be used to reconstruct data associated with an even storage drive in the event the even storage drive fails.

The odd parity subset and even parity subset may be generated and stored in the distributed spares without much additional work. When XOR results are generated for full stride writes to calculate normal parities, there is very little additional work to calculate the even and odd parities. Particularly, the even and odd parities may be derived from intermediate results generated when calculating the normal parities. The odd parity subset may be maintained in the same manner as a normal parity subset except that only strips on odd storage drives contribute to and trigger an update of the odd parity. Similarly, the even parity subset may be maintained in the same manner as a normal parity subset except that only strips on even storage drives contribute to and trigger an update of the even parity.

Figure 7:
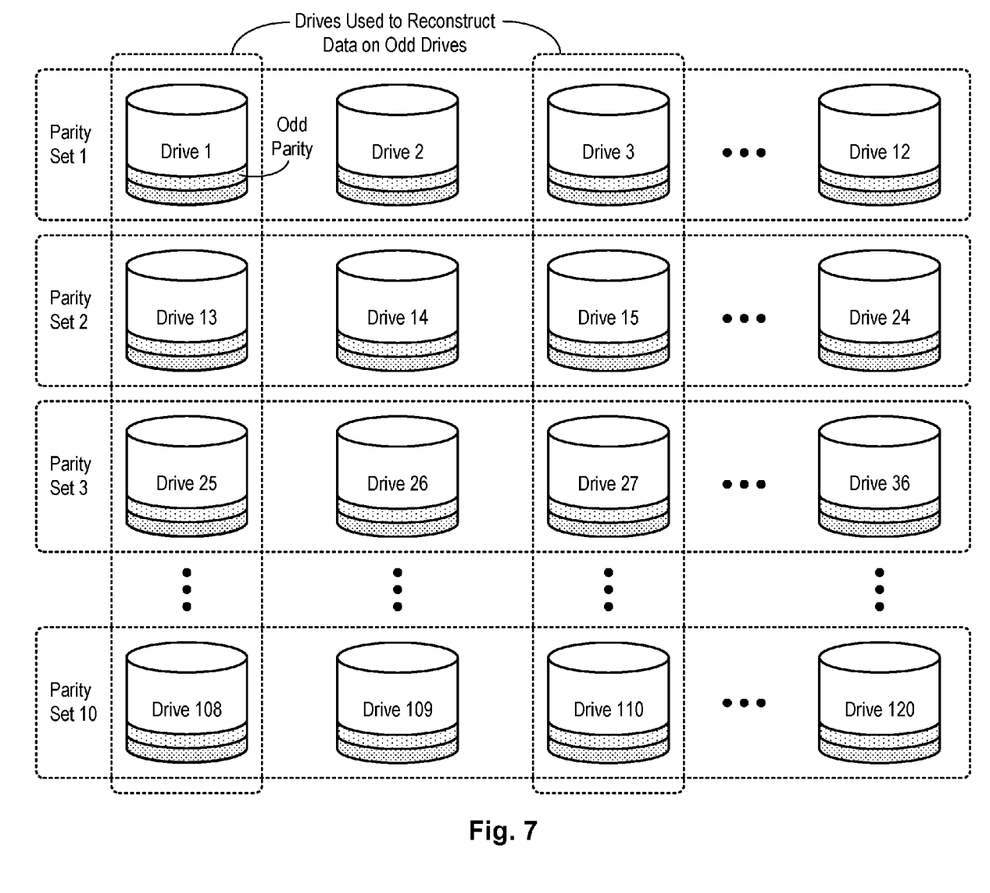
FIG. 7 shows storage drives that may be used to reconstruct data on odd storage drives using the odd parity subset.

When an odd storage drive fails, RAID rebuild hardware/software may be configured to initially look for and utilize the odd parity subset to rebuild the failed storage drive using only odd storage drives in the distributed RAID, as shown in FIG. 7. This will substantially halve the number of storage drives that need to be read when rebuilding data on an odd storage drive. Using the odd parity subset, only five odd storage drives (i.e., six odd storage drives minus the failed odd storage drive), instead of eleven using normal parities, would be needed to reconstruct any particular data element on the failed odd storage drive.

Figure 8:
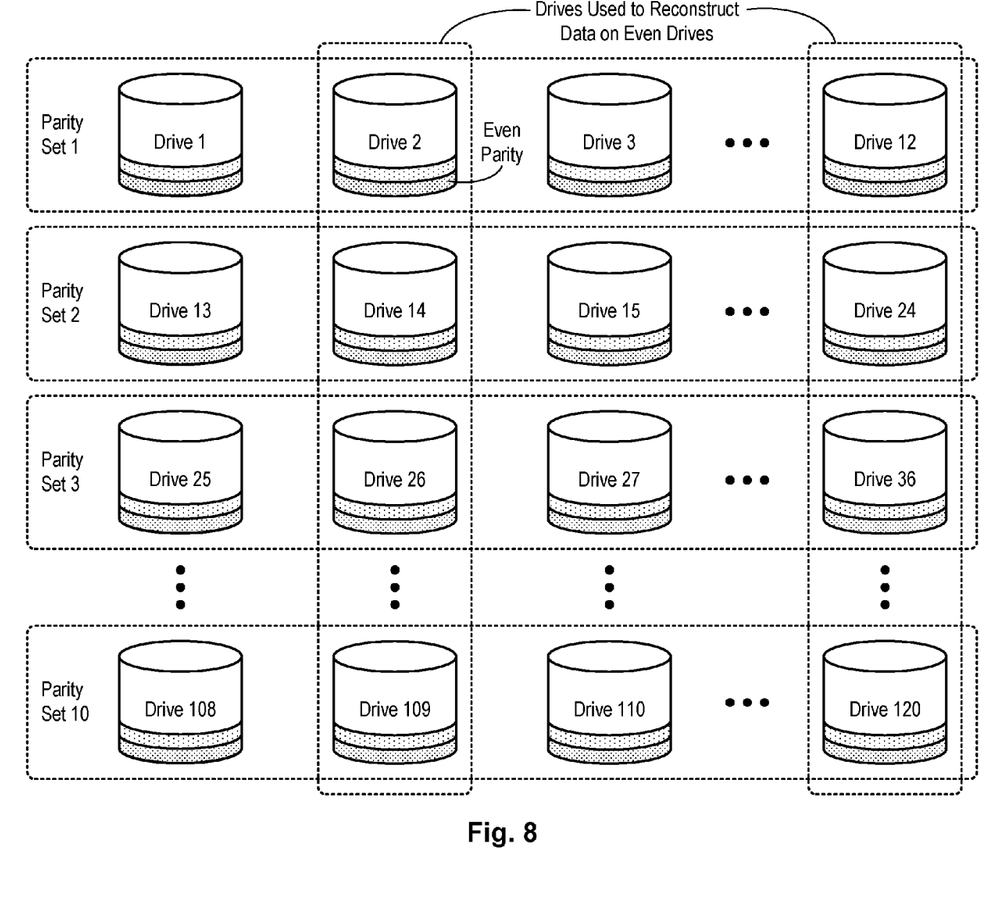
FIG. 8 shows storage drives that may be used to reconstruct data on even storage drives using the even parity subset.

Similarly, when an even storage drive fails, the RAID rebuild hardware/software may be configured to utilize the even parity subset to rebuild the failed storage drive using only even storage drives in the distributed RAID, as shown in FIG. 8. This will also substantially halve the number of storage drives that need to be read when rebuilding data on an odd storage drive. Only five even storage drives (i.e., six even storage drives minus the failed even storage drive) would be needed to reconstruct any particular data element on the failed even storage drive.

The protocol described above substantially reduces the amount of data that needs to be moved through a SAS chip or bus (e.g. PCI bus) on its way to a CPU. This, in turn, may increase the number of storage drives that may be included in a distributed RAID beyond the current limit of approximately one hundred and twenty, potentially doubling or close to doubling this number.

If either of the odd parity subset or even parity subset are not available to reconstruct data associated with a failed storage drive, the data may be reconstructed using the normal parity data on the storage drives. Thus, the odd parity subset and even parity subset may in certain embodiments supplement the normal parity data that is maintained on the storage drives. The odd parity subset and even parity subset may, in certain embodiments, be used primarily for performance optimization when rebuilding a distributed RAID. Advantageously, the odd parity subset and even parity subset do not consume additional storage space on the distributed RAID since they are maintained in normally empty storage space of distributed spares. When one or more distributed spares are needed to store data during a RAID rebuild, the odd parity subset and/or even parity subset may be overwritten and/or discarded without adverse consequences.

Embodiments of the invention may be extended to include additional distributed spares and parity subsets to divide the storage drives into even more disjoint sets. For example, use of four parity subsets in four distributed spares would halve again the amount of data that needs to be read from the distributed RAID in order to rebuild data associated with a failed storage drive, without increasing the amount of parity data that needs to be updated. This, in turn, would further increase the number of storage drives that may be included in a distributed RAID. The number of disjoint sets are not limited to $2^x$, as described in the examples above. For example, the number of disjoint sets could be three. Furthermore, the disjoint sets are not necessarily equal in size or required to cover the entire set of storage drives in the distributed RAID, although in most embodiments this would be the case. None of the characteristics described above (i.e., disjointedness, 100 percent coverage, equal size, etc.) are necessary to substantially achieve the results of the invention. Thus, embodiments of the invention that do not include disjointedness, 100 percent coverage, equal size, etc., are intended to be captured within the scope of the invention.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for recovering a failed storage drive in a redundant array of independent disks (RAID) utilizing wide striping and distributed spares, the method comprising:
    storing, on a first distributed spare of the RAID, a first parity subset for a first set of drives in the RAID, the first parity subset supplementing normal parity data maintained in the RAID and providing an alternative way to recover data on a drive belonging to the first set using a lesser number of drives compared to using the normal parity data;
    storing, on a second distributed spare of the RAID, a second parity subset for a second set of drives in the RAID, the second parity subset supplementing the normal parity data and providing an alternative way to recover data on a drive belonging to the second set using a lesser number of drives compared to using the normal parity data;
    in the event a storage drive in the RAID fails, determining whether the failed storage drive belongs to the first or second set;
    using the first parity subset on the first set of drives in the RAID to recover the failed storage drive in the event the failed storage drive belongs to the first set; and
    using the second parity subset on the second set of drives in the RAID to recover the failed storage drive in the event the failed storage drive belongs to the second set.

2. The method of claim 1, wherein recovering the failed storage drive comprises initially recovering the failed storage drive on at least one of the first distributed spare and the second distributed spare.

3. The method of claim 2, wherein initially recovering the failed storage drive on at least one of the first distributed spare and the second distributed spare comprises overwriting at least one of the first parity subset and the second parity subset.

4. The method of claim 1, wherein using the first parity subset on the first set of drives comprises reading only from the first set of drives.

5. The method of claim 1, wherein using the second parity subset on the second set of drives comprises reading only from the second set of drives.

6. The method of claim 1, wherein, in the event the first parity subset is needed but not available, using the normal parity data to recover the failed storage drive.

7. The method of claim 1, wherein, in the event the second parity subset is needed but not available, using the normal parity data to recover the failed storage drive.

8. A computer program product for recovering a failed storage drive in a redundant array of independent disks (RAID) utilizing wide striping and distributed spares, the computer program product comprising a computer-readable medium having computer-usable program code embodied therein, the computer-usable program code comprising:
    computer-usable program code to store, on a first distributed spare of the RAID, a first parity subset for a first set of drives in the RAID, the first parity subset supplementing normal parity data maintained in the RAID and providing an alternative way to recover data on a drive belonging to the first set using a lesser number of drives compared to using the normal parity data;
    computer-usable program code to store, on a second distributed spare of the RAID, a second parity subset for a second set of drives in the RAID, the second parity subset supplementing the normal parity data and providing an alternative way to recover data on a drive belonging to the second set using a lesser number of drives compared to using the normal parity data;
    computer-usable program code to, in the event a storage drive in the RAID fails, determine whether the failed storage drive belongs to the first or second set;
    computer-usable program code to use the first parity subset on the first set of drives in the RAID to recover the failed storage drive in the event the failed storage drive belongs to the first set; and
    computer-usable program code to use the second parity subset on the second set of drives in the RAID to recover the failed storage drive in the event the failed storage drive belongs to the second set.

9. The computer program product of claim 8, wherein recovering the failed storage drive comprises initially recovering the failed storage drive on at least one of the first distributed spare and the second distributed spare.

10. The computer program product of claim 9, wherein initially recovering the failed storage drive on at least one of the first distributed spare and the second distributed spare comprises overwriting at least one of the first parity subset and the second parity subset.

11. The computer program product of claim 8, wherein using the first parity subset on the first set of drives comprises reading only from the first set of drives.

12. The computer program product of claim 8, wherein using the second parity subset on the second set of drives comprises reading only from the second set of drives.

13. The computer program product of claim 8, further comprising computer-usable program code to, in the event the first parity subset is needed but not available, use the normal parity data to recover the failed storage drive.

14. The computer program product of claim 8, further comprising computer-usable program code to, in the event the second parity subset is needed but not available, use the normal parity data to recover the failed storage drive.

15. A system for recovering a failed storage drive in a redundant array of independent disks (RAID) utilizing wide striping and distributed spares, the system comprising:

at least one processor;

at least one memory device coupled to the at least one processor and storing instructions for execution on the at least one processor, the instructions causing the at least one processor to:

store, on a first distributed spare of the RAID, a first parity subset for a first set of drives in the RAID, the first parity subset supplementing normal parity data maintained in the RAID and providing an alternative way to recover data on a drive belonging to the first set using a lesser number of drives compared to using the normal parity data;

store, on a second distributed spare of the RAID, a second parity subset for a second set of drives in the RAID, the second parity subset supplementing the normal parity data and providing an alternative way to recover data on a drive belonging to the second set using a lesser number of drives compared to using the normal parity data;

in the event a storage drive in the RAID fails, determine whether the failed storage drive belongs to the first or second set;

use the first parity subset on the first set of drives in the RAID to recover the failed storage drive in the event the failed storage drive belongs to the first set; and     use the second parity subset on the second set of drives in the RAID to recover the failed storage drive in the event the failed storage drive belongs to the second set.

16. The system of claim 15, wherein recovering the failed storage drive comprises initially recovering the failed storage drive on at least one of the first distributed spare and the second distributed spare.

17. The system of claim 16, wherein initially recovering the failed storage drive on at least one of the first distributed spare and the second distributed spare comprises overwriting at least one of the first parity subset and the second parity subset.

18. The system of claim 15, wherein using the first parity subset on the first set of drives comprises reading only from the first set of drives.

19. The system of claim 15, wherein using the second parity subset on the second set of drives comprises reading only from the second set of drives.

20. The system of claim 15, wherein the instructions further cause the at least one processor to, in the event at least one of the first parity subset and the second parity subset is needed but not available, use the normal parity data to recover the failed storage drive.

* * * * *